No. 774,869. Patented November 15, 1904.

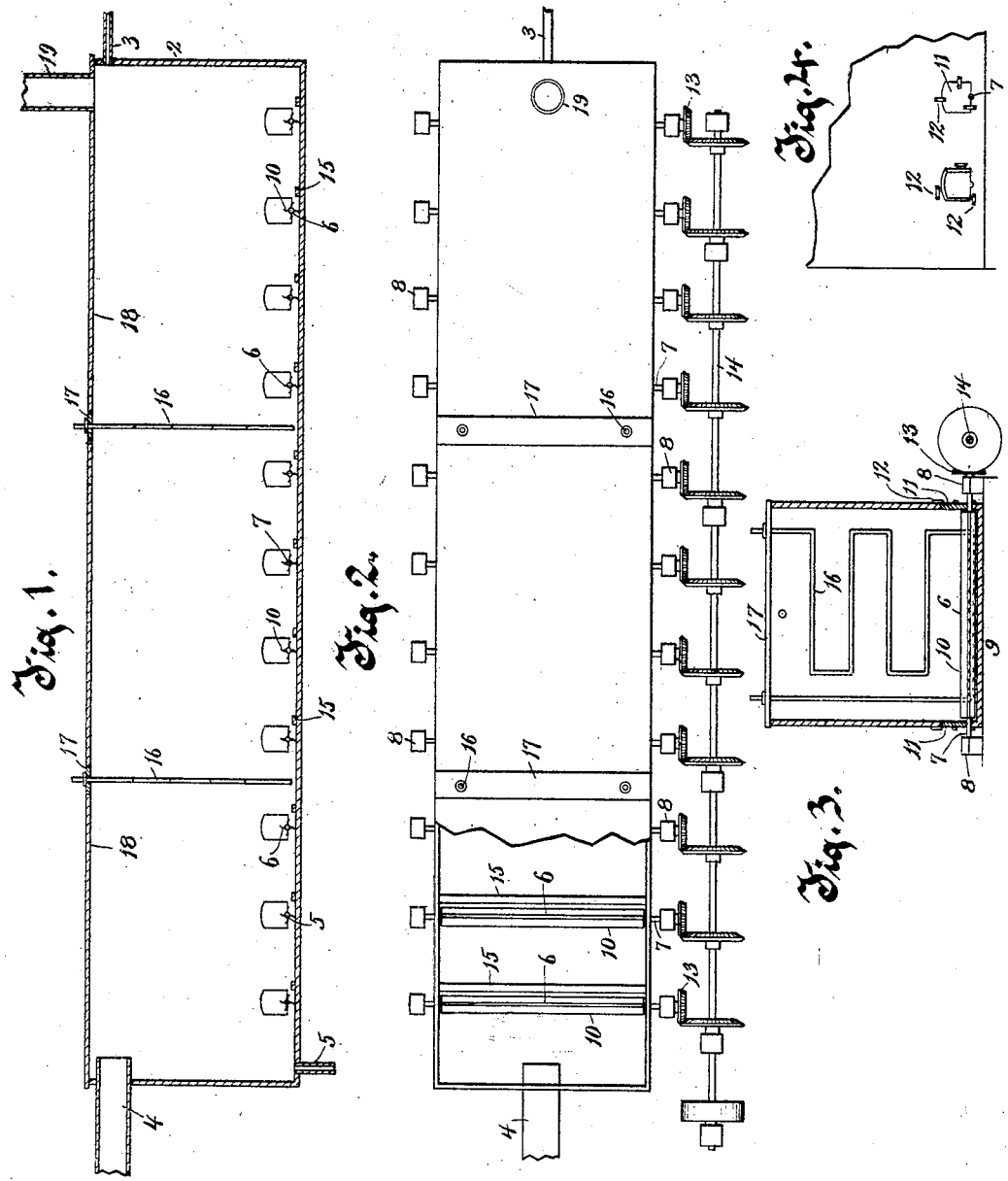

UNITED STATES PATENT OFFICE.

PAUL DREWSEN AND JOHN PARENT, OF SHAWANO, WISCONSIN, ASSIGNORS TO DREWSEN-PARENT CONSTRUCTION COMPANY, OF SHAWANO, WISCONSIN, A CORPORATION OF WISCONSIN.

APPARATUS FOR PREPARING BISULFITE LIQUOR.

SPECIFICATION forming part of Letters Patent No. 774,869, dated November 15, 1904.

Application filed November 4, 1903. Serial No. 179,761. (No model.)

*To all whom it may concern:*

Be it known that we, PAUL DREWSEN and JOHN PARENT, residing at Shawano, in the county of Shawano and State of Wisconsin, have invented a new and useful Improvement in Apparatus for Preparing Bisulfite Liquor, of which the following is a description, reference being had to the accompanying drawings, which are a part of this specification.

In the manufacture of pulp, either from wood or other fibrous matter, by the sulfite process a bisulfite liquor is employed, which liquor is produced by mixing $SO_2$ gases with milk of lime as a base, and the means and method commonly employed for this purpose consist of a tank or tanks containing a thousand or more gallons of milk of lime, into and through which the gases are forced by some powerful means, as by strong vacuum-pumps or large centrifugal pumps, it being necessary for the proper absorption of the gases by the milk of lime to so considerably agitate or disturb the liquid (milk of lime) as to, to some extent at least, divide and separate it advisably into more or less of a spray condition in the presence of the gases. This is a very slow and consequently expensive process and is not entirely satisfactory, even as to the completeness with which the result is effected.

Our invention relates to an apparatus by means of which this mixing of the gases with the milk of lime can be accomplished rapidly and successfully by comparatively simple and inexpensive means and with a less amount of force than has heretofore been employed for mixing the gases with the liquid.

Our invention consists of the apparatus, its parts, and combinations of parts, as herein described and claimed, or the equivalents thereof.

In the drawings, Figure 1 is a vertical longitudinal section of a tank and other devices therewith embodying our invention. Fig. 2 is a top plan view of the tank and other parts of the apparatus therewith, a portion of the cover of the tank being broken away and removed to exhibit interior construction. Fig. 3 is a transverse section of the tank, showing other parts of the apparatus therewith. Fig. 4 shows a fragment of one side of the tank, illustrating particularly small doors in the side of the tank for removing interior parts of the apparatus.

In the drawings, 2 represents a tank of such size and form as is desirable for holding a considerable quantity of the milk of lime while being changed into bisulfite liquor by having gases mixed therewith. This tank may be of any suitable material, but wood is advisably employed, and preferably yellow pine. The tank is provided with an inlet-port 3 for supplying the tank with milk of lime and at the other end with an inlet-port 4 for supplying the tank with the gases that are to be mixed with and absorbed by the milk of lime. Also a discharge-port 5 is provided in the bottom of the tank near that end most distant from the inlet-port 3, this discharge-port being advisably formed of a pipe. For agitating the milk of lime in the tank and, in fact, for throwing it upwardly into sheets or in a spray, so as to permit the gases to readily and thoroughly mix with the liquid, we provide a considerable number of agitators 6, each consisting of a shaft 7, extending through the tank from side to side near the bottom thereof and having bearing-boxes 8 on any suitable frame or support 9 outside of the tank, on which shaft radially-extending blades are fixed. These blades are preferably slightly curved from a radial plane and are advisably substantially as long as the interior width of the tank. The shafts 9 are so located in the tank that the blades as the shaft rotates come close to the bottom of the tank. The shafts where they pass through the sides of the tank are provided with a packing, of any material and form in common use, adapted for the purpose of making the connection substantially gas-tight. In one side of the tank an aperture or doorway is provided at and above each shaft to permit of the removal of the agitator from the tank therethrough, the aperture or doorway being closed by a door 11, secured in place by any convenient means, as by turn-buttons 12, hinged on the side of the tank. The agitators may be rotated by a pinion 13 on each shaft, the pinions gearing with wheels on a driving-shaft 14 or by equivalent means. To prevent the liquid from flowing back along on the bottom of the tank after it has been thrown up into a spray and has fallen again in the tank, a series of dams or riffle-bars 15 is provided, consisting advisably of strips of wood, conveniently two-by-four pieces, extending across the tank from side to side and nailed to the bottom thereof between each two of the agitators and advisably near to and behind each agitator in the direction of the flow of the material from the inlet-port to the discharge-port.

For preserving a suitable temperature of the liquid and the interior of the tank, and especially to prevent undue or overheating thereof, particularly in the summer, means are provided for conveying running water through the tank in suitable conduits therefor. These conduits may each consist of a pipe 16, advisably a rigid pipe passing into the tank through a removable bar 17, adapted to rest on the top edges of the sides of the tank, the pipe being advisably bent or carried in return-pipe form back and forth substantially across the interior of the tank and downwardly to near the bottom of the tank, where it is carried across the tank and thence upwardly and out through the bar 17. This pipe-section 16 may be supported on the bar 17 by means of collars tight on the pipe about it above and resting on the bar 17. These pipe-sections, with the bar 17, are adapted to be readily removed from the tank and may be supplied in such number as is found desirable, being advisably so located as to depend into the tank between the agitators. The extremities of the pipe-sections 16 may be connected up to a source of supply and a discharge by flexible rubber pipe or some analogous means.

The tank should be provided with covers 18, and these may extend from the ends of the tank to the transverse bars 17 and also between these bars. One of these covers should be provided with a vent-aperture 19 for the discharge of nitrogen and oxygen gases. The covers may be secured to the tank in any convenient manner, by which they can be readily removed for getting at the interior of the tank for cleaning it. The cleaning of the tank can always be readily accomplished by removing the covers and lifting out the pipe-sections 16 and withdrawing the agitators 6 through the doorways normally closed by the doors.

In a very cold climate if it shall be found necessary to do so the pipe-sections 16 may be employed to introduce warm or hot water into the tank for raising the temperature therein during winter months to prevent freezing when the apparatus is shut down.

In use it has been found that this apparatus is very successful in that the gases are by the operation of the agitators brought into extensive and satisfactory contact with the agitated or sprayed milk of lime, so that as the liquor flows off through the discharge-port 5 it is found to be clear and completely and thoroughly formed bisulfite liquor of the quality and character required for digesting wood or other fibrous matter for producing pulp.

What we claim as our invention is—

1. In apparatus for preparing bisulfite liquor, an elongated stationary tank having a substantially flat bottom, a plurality of revoluble agitators in and across the tank near the bottom, and a dam across the tank on the floor behind each of the agitators.

2. In apparatus for preparing bisulfite liquor, an elongated tank provided with inlet and outlet ports and a cover, agitators each consisting of a shaft provided with blades in and across the tank near the bottom thereof, dams across the tank on the floor thereof between the agitators, and removable pipe-sections having return-bends suspended in the tank and adapted to carry temperature-controlling water through them.

3. In apparatus for preparing bisulfite liquor, an elongated tank provided with inlet and outlet ports and a cover, agitators each consisting of a shaft provided with blades in and across the tank near the bottom thereof, and pipe-sections, each section consisting of a piece of pipe formed with a plurality of return-bends and transversely-disposed intermediate portions of pipe, and a bar to which the pipe is secured, the bar being adapted to rest on the top edges of the tank and support the pipe-section suspended therefrom in the tank.

4. In apparatus for preparing bisulfite liquor, a closed tank provided with a liquid-supply port at one end, a gas-supply port and a discharge-port at the other end, and with a gas-vent, a series of rotatable agitators within and across the tank near its bottom, and dams across the tank on its floor behind the agitators.

In testimony whereof we affix our signatures in presence of two witnesses.

PAUL DREWSEN.
JOHN PARENT.

Witnesses to Paul Drewsen:
L. CLARK WRIGHT,
NORMAN T. DRAKE.

Witnesses to John Parent:
ADOLPH SPENGLER,
F. A. EBERLEIN.